(12) United States Patent
Faircloth et al.

(10) Patent No.: US 6,219,957 B1
(45) Date of Patent: Apr. 24, 2001

(54) FILAMENT CONNECTOR

(76) Inventors: Michael John Faircloth, 57 John Walker Drive, Manurewa, Auckland 1702; Colin Graeme Gower, 22 Wainoni Heights, Greenhithe, Auckland, both of (NZ)

(*) Notice: Subject to any disclaimer, the term of this patent is extended or adjusted under 35 U.S.C. 154(b) by 0 days.

(21) Appl. No.: 09/381,339
(22) PCT Filed: Mar. 13, 1998
(86) PCT No.: PCT/NZ98/00035
  § 371 Date: Sep. 20, 1999
  § 102(e) Date: Sep. 20, 1999
(87) PCT Pub. No.: WO98/41086
  PCT Pub. Date: Sep. 24, 1998

(30) Foreign Application Priority Data

Mar. 19, 1997 (NZ) ................................................ 314445

(51) Int. Cl.⁷ .................................................. A01K 91/00
(52) U.S. Cl. .......................................................... 43/44.93
(58) Field of Search ............................. 43/42.08, 42.36, 43/42.49, 44.83, 44.92, 44.93, 44.86; 24/136 K, 136 R

(56) References Cited

U.S. PATENT DOCUMENTS

| | | |
|---|---|---|
| 524,928 * | 8/1894 | Bacon . |
| 2,214,961 * | 9/1940 | Hawley . |
| 3,766,610 * | 10/1973 | Thorsbakken ................... 24/115 R |
| 4,313,243 | 2/1982 | Childress et al. . |
| 4,602,891 | 7/1986 | McBride . |
| 4,718,788 | 1/1988 | Briscoe . |
| 4,809,408 | 3/1989 | Abrahamson . |
| 5,471,713 * | 12/1995 | Alter .............................. 24/136 R |

FOREIGN PATENT DOCUMENTS

| | | | |
|---|---|---|---|
| 107636 * | 12/1916 | (GB) | ............................ 24/136 K |
| 1 550 312 | 8/1979 | (GB) . | |
| 646 125 | 2/1979 | (SU) . | |

* cited by examiner

*Primary Examiner*—Charles T. Jordan
*Assistant Examiner*—Francis T. Palo
(74) *Attorney, Agent, or Firm*—Young & Thompson

(57) ABSTRACT

A filament connector for fastening a fishing hook or a swivel to a fishing line, or for fastening two fishing lines together, includes a body provided with an internal cavity connected to the exterior of the body by an aperture, a pair of walls of the cavity converged towards the aperture, a wedge member positioned and movable within the cavity has part surfaces facing the walls of the cavity, whereby a filament can be formed into a bight within the cavity, around the wedge member and out through the aperture so that tension in the filament pulls the wedge member towards the aperture, the filament becoming trapped between at least one of the walls and the adjacent part surface of the wedge member.

18 Claims, 4 Drawing Sheets

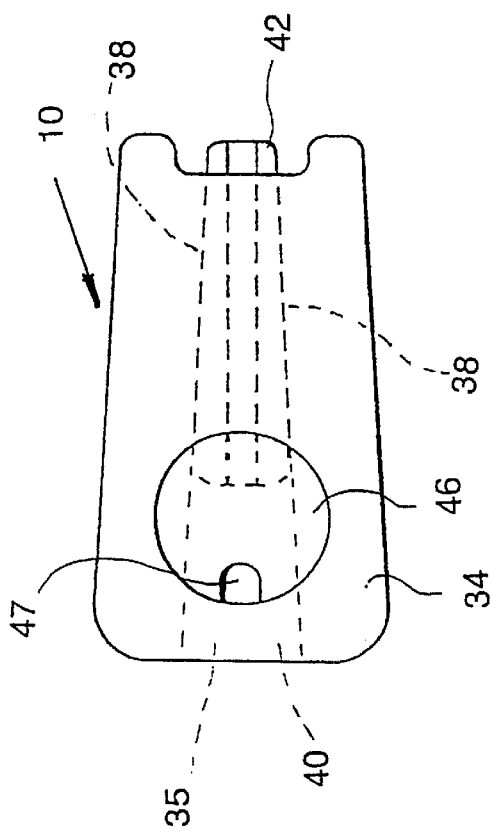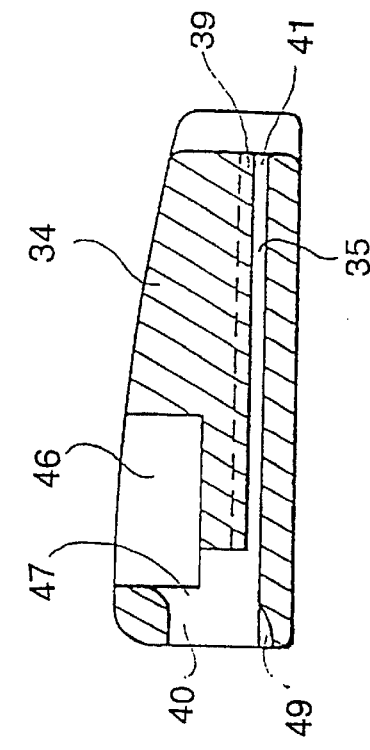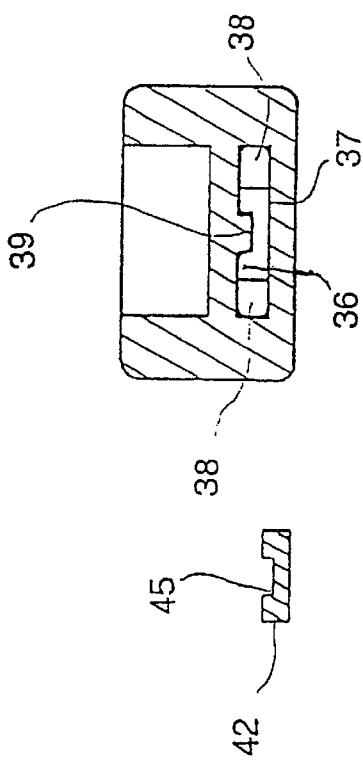

FILAMENT CONNECTOR

BACKGROUND

This invention relates to filament connectors, and is applicable, particularly but not exclusively, to filament connectors to be used on monofilament plastics lines, such as fishing lines. The expression "filament" used herein includes cords, ropes, straps, steel wires and monofilament plastics lines, nylon spider wire and any other form of fishing line or other constraining material.

OBJECT OF THE INVENTION

Commonly, such filaments are connected together or to other objects by the use of knots. However, it has been found that knots have the effect of reducing the breaking load of the filament by up to 50%. This is highly undesirable, since the breaking load is often a crucial parameter of a filament.

STATEMENT OF THE INVENTION

According to one aspect of the present invention there is provided a filament connector including a body provided with an internal cavity, the cavity being open to the exterior of the body through an aperture, the interior of the cavity defining a pair of cavity walls converging towards said aperture, a wedge member positioned within said cavity and having a pair of part surfaces each facing a different one of said cavity walls, the wedge member having a degree of freedom of movement towards and away from the aperture, whereby a filament can be formed into a bight inside the cavity, the bight passing around that part of the wedge member remote from the aperture and between at least one of said cavity walls and the adjacent part surface of the wedge member, so that tension in the filament outside the connector pulls the wedge member toward the aperture and compresses the filament between the cavity wall and the adjacent part surface of the wedge member.

Preferably the part surface and adjacent cavity wall are parallel and may be flat.

Advantageously, both of the part surfaces are parallel to the adjacent cavity walls and are flat.

Conveniently the surface of the wedge member joining the two part surfaces and remote from the aperture is smoothly curved and preferably tangential to said part surfaces.

Preferably the body is provided with an openable lid to expose the cavity, when open, the body or the lid carrying the wedge member by a connection which is flexible, frangible or which has limited sliding movement towards the aperture, the wedge member being located, such that when the lid is closed, the wedge member is positioned within said bight.

Advantageously the lid is held closed by clip means.

Conveniently the body is provided with two or more of said cavities, apertures and wedge members, whereby bights of different filaments may be fastened to the body and thereby to each other.

According to another aspect of the present invention there is provided a filament connector, as described above, adapted to be fastened to a monofilament fishing line.

Conveniently the body, at a position remote from the aperture, is adapted to locate and retain an element of a fishing component, such as an eye of a fishing hook or of a swivel.

BRIEF DESCRIPTION OF THE DRAWINGS

Various embodiments of the invention are described, by way of example only, with reference to the accompanying drawings, in which:

FIG. 6 is a plan view of another embodiment of the invention, FIG. 8 is a section along the lines VIII—VIII in FIG. 7, FIG. 9 is a longitudinal section along the line IX—IX in FIG. 7, FIG. 10 is a transverse section along the line X—X in FIG. 7.

DESCRIPTION

Figure 1:
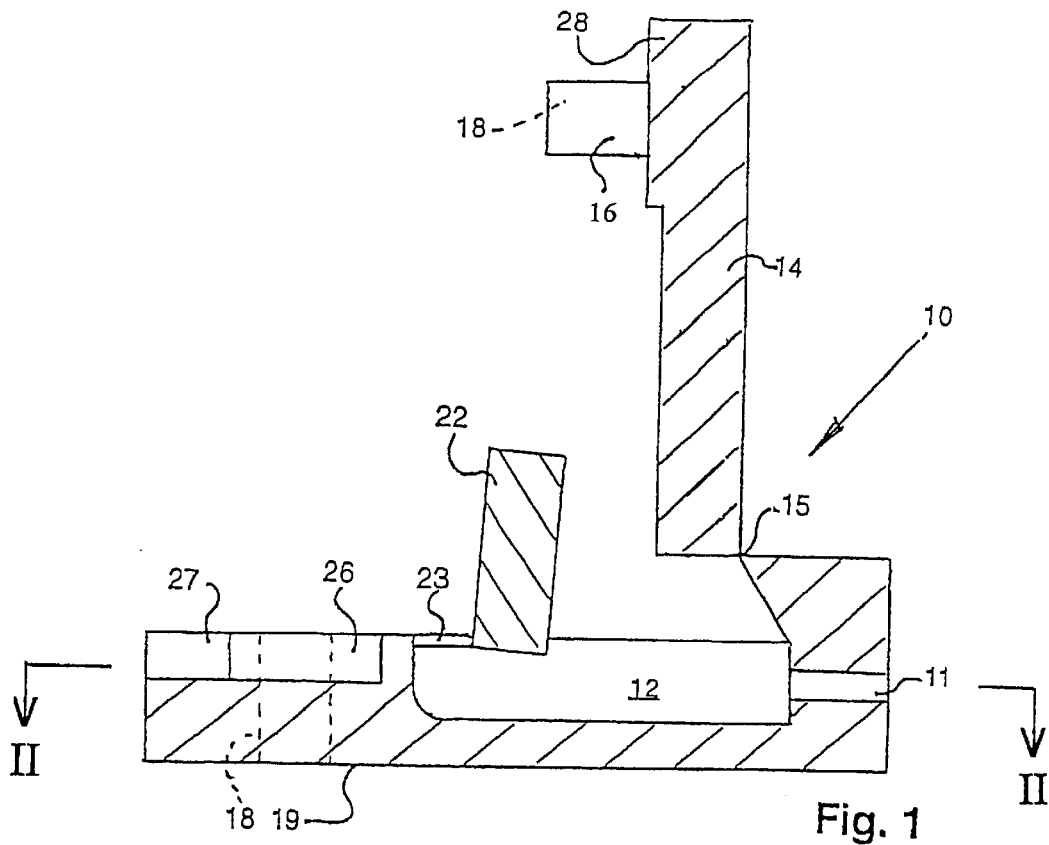
FIG. 1 is a section in a central longitudinal plane through one embodiment of a filament connector according to the invention, before use.
Figure 2:
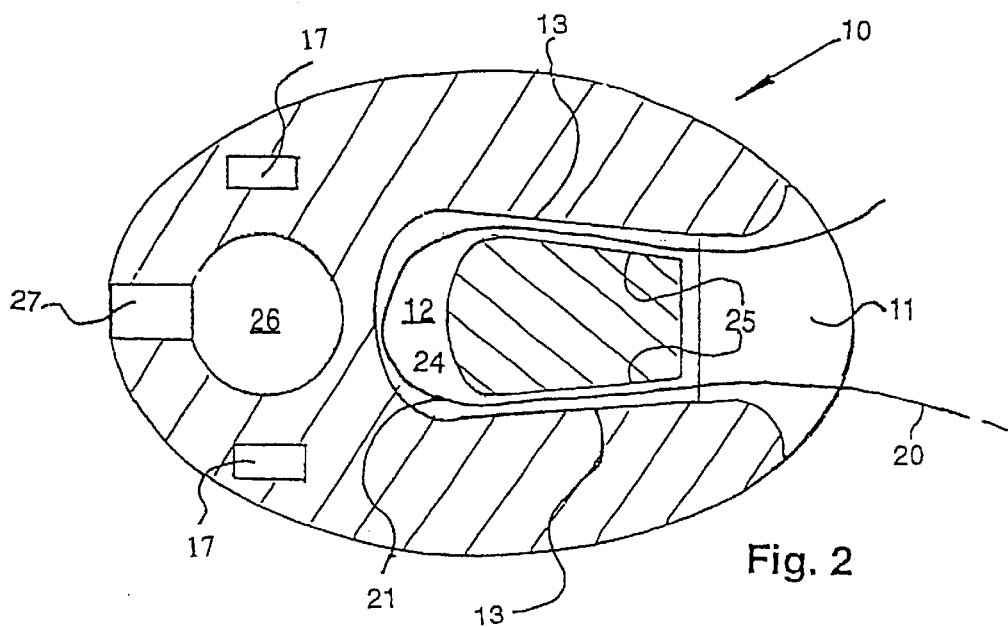
FIG. 2 is a section along the line II—II in FIG. 1 of the filament connector ready for use.
Figure 3:
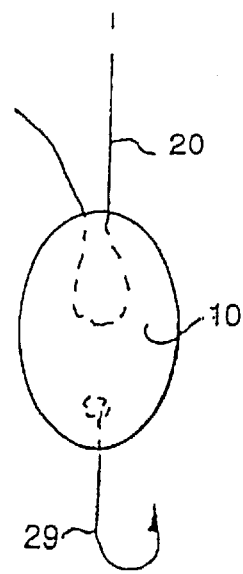
FIG. 3 shows the filament connector of FIGS. 1 and 2 at a typical full size for holding a fish hook.

In FIGS. 1, 2 and 3 a filament connector 10, typically made of plastics is of elliptical shape. At one end an aperture 11 extends into an internal cavity 12. The cavity 12 defines a pair of walls 13 which converge towards the aperture 11.

A lid 14 of the connector 10 is conveniently formed integral therewith and joined thereto along a thin hinge line 15. The lid has a pair of protruding prongs 16 aligned, as the lid 14 is closed, to pass through co-acting slots 17 in the connector. As the lid 14 reaches the closed position, a wedge 18 on each prong 16 springs outwards to catch under the lower surface 19 of the connector, and thereby hold the lid 14 shut.

Before starting to close the lid 14, a filament 20, to which the connector 10 is to be attached, is formed with a bight 21, which is pushed through the aperture 11 and into the cavity 12. The natural springiness of the bight 21 moves the filament against or adjacent the walls 13.

A wedge member 22 preferably formed integral with the connector 10, is connected thereto by a frangible link 23.

The wedge member 22 is folded down into the cavity, so as to lie within the bight 21 and thereupon breaks free of the link 23. The wedge member 22 is formed with a rounded end 24, remote from the aperture 11 and a pair of inclined wall 25, each adjacent and substantially parallel to a different one of the cavity walls 13.

Tension in the filament 20 pulls the bight 21 against the rounded end 24 and thence pulls the wedge member 22 toward the aperture 11. The walls 13, 25 grip the filament 20 and compress it so that it cannot slip and is, therefore connected to the filament connector 10.

At the opposite end from the aperture 11 the connector 10 is formed with a depression 26 in which the eye of a fishing hook, swivel, sinker or the like is a snug fit, the shank of the hook extending out through a groove 27. A protrusion 28 on the lid 14 engages in the depression 26 and groove 27 to give stability.

Instead of the wedge member 22 being attached to the connector 10 it could be attached by a similar frangible link to the lid 14.

Instead of the frangible link 23, a flexible or sliding connection can be provided between the wedge member 22 and the connector 10 or the lid 14, provided that the wedge member can move freely towards the aperture 11 until the filament 20 is compressed.

An eye of a fishing swivel, sinker or the like can be held in the depression 26, instead of the eye of the hook 29 seen in FIG. 3.

Figure 4:
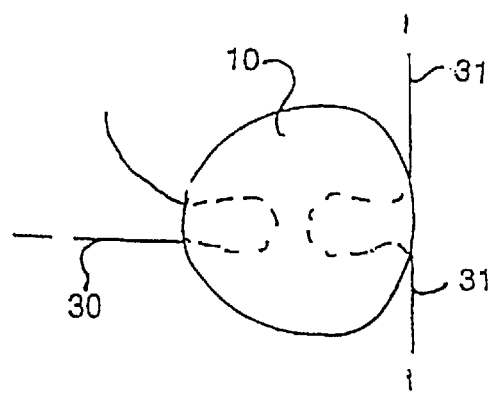
FIG. 4 shows an alternative to FIG. 3, fastening a spur filament to a long line filament.
Figure 5:
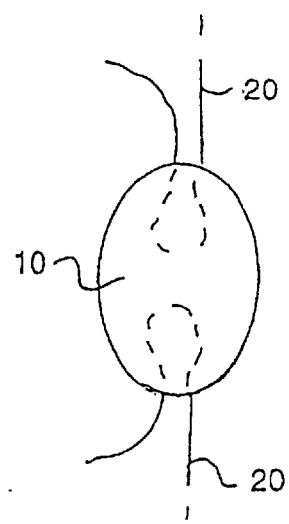
FIG. 5 shows an embodiment of the invention joining the ends of two filaments.
Figure 7:
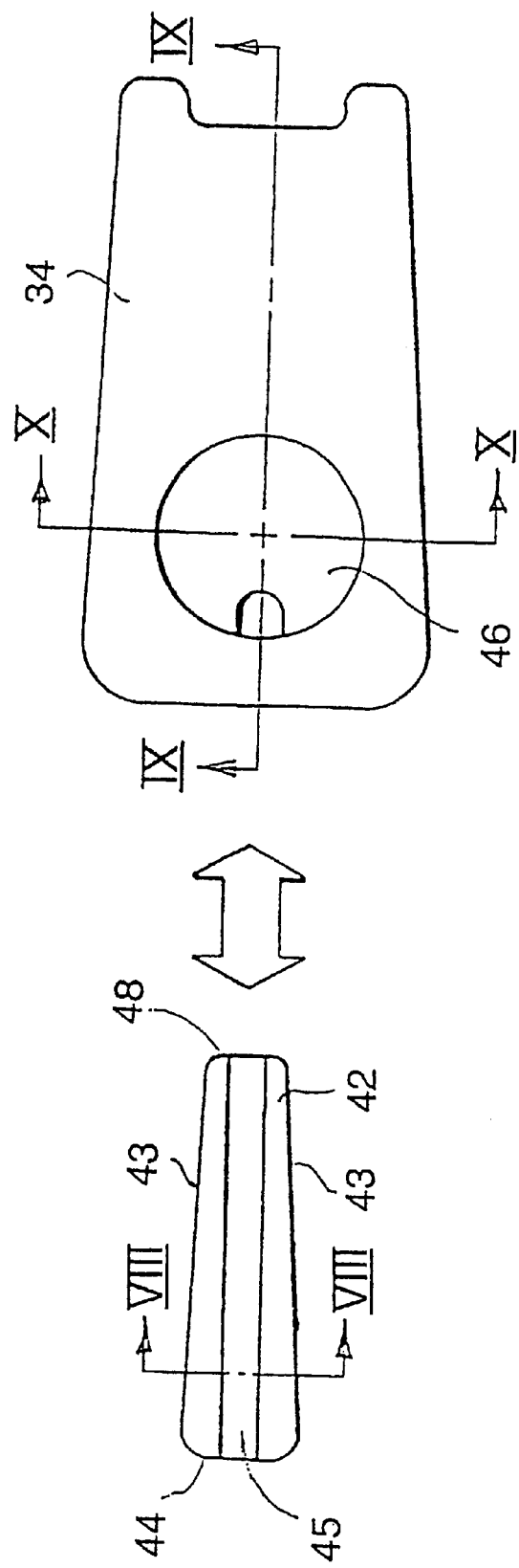
FIG. 7 is an exploded view of FIG. 6.

FIG. 4 shows the use of a connector 10 to join one end of a spur line 30 at an intermediate position along a long line 31. In this design, the filament connector 10 has two apertures 11, cavities 12 and wedge member 22 at opposite ends thereof. The spur line 30 has a bight 21 formed adjacent one end thereof, which is gripped within one of said cavities. A length of the long line 31 is also formed into a bight 21 which is pushed into the other of the cavities 13. When the lines 30, 31 are pulled, they are fastened to the connector 10 and thereby to each other. FIG. 5 shows a similar design adapted to be connected to the ends of two filaments 20, which thereby become connected to each other.

In FIGS. 6 to 10, a filament connector 10 includes a one-piece body 34 which is conveniently moulded of a suitable plastics. As can be seen from FIGS. 6 and 10, the body 34 is formed with a passage 35 right through. The passage 35 has a substantially parallel roof 36 and floor 37 and flat convergent side walls 38. A central rib 39 depends from the roof 36. The passage 35 has broader and narrower open ends 40, 41 respectively.

A loose wedge member 42 is a sliding fit within the passage 35, the wedge member 42 having convergent substantially flat side walls 43 of the same included angle as the side walls 38 of the passage 35. The wedge member 42 has a rounded broader end 44 and a longitudinal central groove 45 into which the rib 39 is a sliding fit, whereby the wedge member 42 is constrained to slide centrally along the passage 35. When the side walls 43 bear against the side walls 38 of the passage 35, the narrow end 48 of the wedge member 42 protrudes beyond the narrow end 41 of the passage 35, so that the wedge member 42 can be pushed back up the passage 35.

A cylindrical depression 46 is formed into the top of the body 10 and is connected into the passage 35 by an opening 47.

To attach a fishing line to the filament connector 10, the wedge member 42 is pushed back towards to broader end 40 of the passage so that there is a space between each side wall 38 and the adjacent sidewall 43. One end of the fishing line is threaded into the narrower end 41 of the passage 35 and into one of said spaces. The line is pushed until it appears out of the broader end 40 of the passage 35. It is then bend round and the end inserted into the broader end 40 into the other of said spaces and pushed until it emerges from the narrower end 41. Thus, the line substantially encompasses the wedge member 42.

When the line, and its free end are together pulled, the wedge member 42 is drawn through the passage 35 until the line becomes trapped between the wedge member 42 and the convergent side wall 38. The harder the main length of line is pulled, the tighter it, and the free end length, become gripped.

It has been found that, for nylon monofilament fishing line and for the types of plastics used for the connector, an included angle between the side walls 38, and therefore between the sidewalls 43, of 8 to 9 degrees gives optimum grip and function. At an included angle of 6 degrees it becomes difficult to disengage the wedge member 42 and at included angles of 10 degrees or more, inadequate grip is achieved, particularly of lines having nominal breaking loads of 2 to 5 Kg.

To attach a conventional fishing hook to the filament connector 10, the barbed point of the hook is passed first through the depression 46, then through the opening 47 and out through the broader end 40 of the passage 35. The shank of the hook is maneouvered to follow the point until eventually the circular eye of the hook nests in the depression 46. The hook is then effectively held by the connector 10. In order to assist passage of the barbed point, a small groove 49 may be formed in the floor 37, to accommodate parts of the hook, as it passes through.

Game fishing quality line, to the standards of the International Game Fishing Association typically breaks at around 29.5 Kg for a 20 Kg nominal line under a straight pull. When such line is knotted, the stress raising effect of the knot causes breakage at around 22.5 Kg.

However, if one of the filament connectors 10 is used instead of a knot to attach a hook, for example, breakage occurs at around 97% of the actual breaking force ie. 97% of around 29.5 Kg. It has been found that the factor of around 97% is achieved for lines from 1 Kg to 30 lbs nominal breaking force.

In some embodiments of the invention, the body 34 can be devised as a lure itself. For example, it can be of bright, reflective or fluorescent colouring or made in the shape of a fish or other bait etc or can be shaped so as to spin or wriggle in known manner.

What is claimed is:

1. A filament connector comprising:
   a body with an internal cavity open to the exterior of the body through an aperture,
   an interior of the cavity defining a pair of cavity walls converging towards said aperture,
   a wedge member positioned within said cavity and having a pair of part surfaces each facing a different one of said cavity walls,
   the wedge member having a degree of freedom of movement towards and away from the aperture,
   wherein a filament can be formed into a bight inside the cavity, the bight passing around that part of the wedge member remote from the aperture and between at least one of said cavity walls and the adjacent part surface of the wedge member, so that tension in the filament outside the connector pulls the wedge member towards the aperture and compresses the filament between the cavity wall and the adjacent part surface of the wedge member,
   an openable lid attached to the body and openable to expose the cavity, and
   the wedge member being carried by a connection which is flexible, frangible or which has limited sliding movement towards the aperture, the wedge member being located, such that when the lid is closed, the wedge member is positioned within said bight.

2. A filament connector according to claim 1 wherein the part surface and adjacent cavity wall are parallel.

3. A filament connector according to claim 2 wherein the part surface and adjacent cavity wall are flat.

4. A filament connector according to claim 1, wherein the body comprises plural cavities, apertures and wedge members, and
   bights of different filaments may be fastened to the body.

5. A filament connector according to claim 1, further comprising a further aperture in said cavity at an opposite end of the cavity to said aperture.

6. A filament connector according to claim 1, wherein the wedge member is constrained to move in a substantially straight line along the center of the cavity.

7. A filament connector according to claim 1, wherein all components of said filament connector are made of a plastic material.

8. A filament connector according to claim 1, further comprising an adaptor to locate and retain an eye of a fishing hook or of a swivel.

9. A filament connector comprising:
   a main body formed with a filament attachment means, and a second attachment means,
   said filament attachment means comprising
   an elongate cavity formed inside said main body and defining a pair of walls which converge towards one end of said cavity at a predetermined taper angle relative to a longitudinal axis of said cavity;
   an aperture provided at said one end of said cavity and communicating between said cavity and an exterior of said main body;
   a wedge member having a pair of opposite walls inclined at substantially the same taper angle as said cavity walls, and adapted so as to be accommodated inside said cavity with said opposite walls adjacent to said cavity walls; and
   a wedge positioning means for positioning said wedge member in said cavity.

10. A filament connector according to claim 9, wherein said wedge positioning means comprises a frangible link located between said wedge member and said main body,
   the strength of said frangible link being such that said link can be broken once a filament has been fitted to said filament attachment means.

11. A filament connector according to claim 9, wherein said wedge positioning means comprises a flexible link located between said wedge member and said main body,
   the resilience of said flexible link being sufficient such that in use, said wedge can be moved towards said aperture to bring said walls together.

12. A filament connector according to claim 9, wherein said wedge positioning means comprises a sliding connection located between said wedge member and said main body for guiding sliding movement of said wedge relative to said main body along said longitudinal axis.

13. A filament connector according to claim 12, wherein said sliding connection comprises a longitudinal groove formed in one of said wedge and said main body and a corresponding mating protrusion formed on the other of said wedge and said main body.

14. A filament connector according to claim 12, wherein said second attachment means and said filament attachment means are substantially the same and are provided in said main body with longitudinal axes thereof substantially parallel to each other.

15. A filament connector according to claim 9, wherein said main body is provided with an openable lid to expose said cavity when said lid is open, and
   said positioning means comprises a connection between said body or said lid which is flexible, frangible or which has limited sliding movement towards said aperture,
   said wedge member being located such that when said lid is closed, said wedge member is positioned in said cavity with said opposite walls of said wedge member spaced apart from said cavity walls.

16. A filament connector according to claim 9, wherein said second attachment means and said filament attachment means are substantially the same and are provided in said main body in a predetermined relation to each other to suit connection of two filaments thereby.

17. A filament connector according to claim 9, wherein said second attachment means comprises
   a depression for accommodating an object such as an eye of a fishing hook, and
   an aperture leading from said depression for passing an elongate member therethrough.

18. A filament connector according to claim 9, wherein said body is of a color, size or shape to simulate or act as a fishing bait.

\* \* \* \* \*